United States Patent [19]

Sogaard

[11] Patent Number: 4,985,083
[45] Date of Patent: Jan. 15, 1991

[54] METHOD FOR DECONTAMINATING A MATERIAL AND AN ASSEMBLY FOR CARRYING OUT SAID METHOD

[75] Inventor: Dennis Sogaard, Svendborg, Denmark

[73] Assignee: A/S Phonix Contractors, Vejen, Denmark

[21] Appl. No.: 293,433

[22] Filed: Jan. 4, 1989

[30] Foreign Application Priority Data

Jan. 5, 1988 [DK] Denmark ............................ 0018/88

[51] Int. Cl.$^5$ .............................................. B08B 3/08
[52] U.S. Cl. ...................................... 134/26; 134/10; 134/11; 134/42; 208/390; 585/867
[58] Field of Search ............. 208/11 LE, 162, 88; 585/867; 203/68, 67, 161; 210/690–693, 708, 711, DIG. 5; 134/2, 42, 10, 11, 26

[56] References Cited

U.S. PATENT DOCUMENTS

| | | | |
|---|---|---|---|
| 1,514,113 | 11/1924 | Trumble | 208/11 LE |
| 2,596,793 | 5/1952 | Schabelitz | 208/11 LE |
| 3,475,318 | 10/1969 | Gable et al. | 208/11 LE |
| 4,387,016 | 6/1983 | Gagon | 208/11 LE |
| 4,424,112 | 1/1984 | Rendall | 208/11 LE |
| 4,424,113 | 1/1984 | Mitchell | 208/11 LE |
| 4,532,024 | 7/1985 | Haschke et al. | 208/11 LE |
| 4,606,774 | 8/1986 | Morris | 134/10 |

FOREIGN PATENT DOCUMENTS

| | | |
|---|---|---|
| 0059020 | 9/1982 | European Pat. Off. . |
| 0070593 | 1/1983 | European Pat. Off. . |
| 0161698 | 11/1985 | European Pat. Off. . |
| 0172056 | 2/1986 | European Pat. Off. . |
| 2022444 | 12/1979 | United Kingdom . |

OTHER PUBLICATIONS

Published PCT appln. of Keane, WO 82/04440, PCT/US82/00819, International publication date 12/1982.
Published PCT appln. of Klockner & Co., WO 86/03134, PCT/EP85/00643, International publication date 6/1986.

*Primary Examiner*—Asok Pal
*Attorney, Agent, or Firm*—Cushman, Darby & Cushman

[57] ABSTRACT

A method and an assembly for decontaminating a material. The material is charged into a container, where at first steam is introduced and fluids including some contaminants are removed. Then extractant is introduced into the container, and fluids comprising condensation water, extractant and contaminants are removed. Then the material is stripped with vapor. The dry or slightly humid material in the container is removed in a condition suitable for return to its place of origin. The used extractant can be purified to be re-used.

12 Claims, 1 Drawing Sheet

METHOD FOR DECONTAMINATING A MATERIAL AND AN ASSEMBLY FOR CARRYING OUT SAID METHOD

FIELD OF THE INVENTION

The present invention relates to a method for decontaminating a material, such as soil, sand, stone and old industrial waste deposits as well as an assembly, for instance a mobile one, for carrying out the method.

BACKGROUND ART

Over the last years mankind has become increasingly aware of the environmental consequences of the methods that are and have been used for the disposal of waste materials. Particular attention has thus been paid to the pollution of surface waters, such as rivers (especially the river Rhine), and lakes, such as the Great Lakes in the USA, and also of seas and oceans, where pollution by for instance oil is a constantly recurring problem. More recently attention has been drawn to the pollution of soil. Numerous examples are known, where industrial waste has been deposited by burying metal drums containing the waste material, or where the waste has been led directly into nature in various ways. These acts have resulted in considerable cleansing operations. Concurrent with pollution due to "sins of the fathers" accidents occur despite increasingly sophisticated precautions where undesirable, environment-destroying, poisonous materials escape into nature. Examples of such accidents include oil-pollution of coastal areas, for instance after ship collisions or loss of ship, or of other areas, for instance after traffic accidents. Various attempts have been made to control environmental pollution, but none of the methods suggested has resulted in a solution of the problems sufficiently attractive with respect to costs involved and the possibility of fast action.

Today several cases are known, where contaminated areas have been discovered, for instance, during the excavation of a building site. A common method used today to remove such contaminations comprises excavating the entire amount of contaminated soil and filling it into drums. These drums are sent to a specialized incinerator plant, such as Kommunekemi in Denmark. Here the entire material is incinerated under controlled conditions ensuring a high combustion temperature. It is necessary to operate with high combustion temperatures, since lower temperatures result in a generation of dioxines, which are generally known to be very toxic. This method is not very suitable as the work connected with excavating the soil, filling it into drums, transporting it to the plant, opening of the drums and filling the material into the incinerator plant is extensive and not at all safe. Transporting large amounts of material is very cost-intensive and the capacity of the incinerator plant has to be considerable. In practice it is almost impossible to return the material to its place of origin, partly because of the transport costs involved and partly because such a return would require a further technical treatment of the material subsequent to its incineration.

For minor contaminations a method is used, where the costs for transport and incineration can be reduced. In this method a controlled deposit is created in form of an excavation provided with a sealing membrane onto which the contaminated material is deposited. With such a deposit it is mandatory to collect and examine, and, if necessary, to treat the rainwater seeping through the material. The deposit has thus to be constantly monitored, often over a period covering many years.

Both above methods are cost intensive, since the amount of contaminated material to be excavated and transported is large. A further problem connected with the incineration is that the contaminated material is often very heterogenous and may result in heavy wear of the plant, for instance in case of brickwork in a rotor incinerator. Another problem is how to control the incineration of the heterogenous waste, which often comprises for instance bituminous residues, phenolic compounds and frequently large amounts of polyaromatic hydrocarbons. To ensure that no poisonous materials, such as dioxines, escape together with the smoke, the incineration has to be made under very stationary conditions. It is, however, difficult and expensive to ensure a stationary incineration of the heterogenous materials in question.

EP Publication No. 0.161.698 A1 discloses a method for purifying soil, such as from petroleum products, by extraction in a scrubber by means of an aqueous liquid of a pH value adapted to the contaminant, whereupon the extractant and the contaminants are separated. In this method the coarse materials are first separated from the soil by means of a sieve unit. This step implies that a portion of the contaminants is removed together with the coarse material and is thus not eliminated. Then the soil and the liquid are mixed. Subsequently the phases are separated and the liquid used is purified by floatation and is re-used. This method requires intricate and expensive equipment, since it requires a rugged device for mixing soil and water as well as a floatation tank. From the results stated in the publication it is moreover apparent that only a partial decontamination is obtained.

EP Publication No. 0.059.020 A1 discloses a method for extracting contaminants from soil by means of water, alcohols or petroleum ether. The method is carried out by introducing the extractant directly into the contaminated soil through tubes extending into the soil. If necessary the contaminated area is first screened off from the surface layer and down to a water-impervious layer. Despite the screening there is a considerable risk of further contamination by spreading the contaminants and the extractant. It is thus mandatory to take extensive precautionary measures. Moreover comprehensive prior investigations concerning the type of contamination and soil have to be undertaken. Finally the method requires large amounts of extractant.

WO Publication No. 86/03134 discloses a method for separating bitumen from broken road surface materials by extraction, preferably with toluene in several steps followed by distillation and recovery of the solvent by condensation. The method is directed to the re-use of asphalt, which means that not all types of compounds usually occuring in connection with contaminated soil are removed. Bituminous material occurs in solid form. It is thus necessary to employ a comparatively sophisticated assembly for carrying out said method using high-pressure steam as well as vacuum together with heat.

GB Patent Application No. 2.022.444 discloses a process for the treatment of oil-containing waste by means of countercurrent extraction in several compartments using a solvent such as kerosene, i.e. a solvent ligther than water. A rotating container is used, said container comprising blades or buckets in each compartment to ensure contact between the waste material and the extractant. This patent application discloses a mechanically complicated process, where the material has to be present in form of an aqueous suspension. The process is applicable for aqueous waste materials and cannot thus be used for purifying contaminated soil materials.

EP Publication No. 0.172.056 A1 discloses a method for washing out oil-containing sand or gravel, where the washing is performed with a solvent composition comprising kerosene and surfactants. Subsequent to the washing the solvent and the oily products are separated. This separation is performed by means of intricate equipment comprising hydrocyclones and flocculation units. The method is unsuitable for removing contaminants of a high content of polymeric compounds.

WO Publication No. 82/04440 discloses a method of separating oil or bitumen from oil sands or tar sands, where a chlorinated hydrocarbon, such as methylene chloride, is used as solvent and a liquid, such as water or alcohol, is used for subsequent treatment. The subsequent treatment allows an easy separation of the oily solution from the sand due to the influence of the solvent on the surfaces of the sand grains. It is also possible to use water first and then the extractant, but it is preferred to use water last. When carrying out the method complicated equipment is used, since the sandy material usually has to be ground and mixed mechanically with the liquids used. Moreover centrifugation or fluidisation are used to recover the solvent.

EP Publication No. 0.070.593 A1 discloses a method for purifying soil by means of a heating medium, especially steam. The method is carried out in situ by injecting the steam through lances extending into the soil. The volatile contaminants driven out of the soil are collected by means of a vacuum clock. Treating the contaminated soil by heating to high temperatures involves a high energy consumption. Another problem is the risk of the contaminants spreading to the adjacent areas despite the use of the vacuum clock. Moreover the method is difficult to control. Finally said method does not remove non- or low-volatile or solid products, such as asphalt, tar and the like.

Different methods for the recovery of oil, bitumen or bituminous oil from oil sand, tar sand or the like by extraction are also known. Such methods are for instance disclosed in U.S. Pat. Nos. 4.424.112, 4.424.113, 4.532.024, 2.596.793, 4.387.016, 3.475.318 and 1.514.113. These methods are, however, directed to recovering the desired materials and are thus not suitable for removing a broad spectrum of contaminants. They are neither intended nor suitable for removing the last residues of the materials/contaminants, since this would render such a process too expensive.

It is also known to remove contaminants by only heating soil. This method does, however, not remove all contaminants. When the material contains for instance high-molecular, chlorinated compounds, such as PCB, chlorinated paraffines or the like, a moderate heating, i.e. a heating to below 1200° C., can cause a partial decomposition of such compounds. The resulting decomposed products can have a negative influence on the environment, as they may be highly toxic, and may exceed the negative environmental impact of the original contaminants.

It is furthermore known to remove contaminants by biological means, which is, however, a very time-consuming process. Moreover, biological methods can only be used in case of slightly oil-contaminated materials. In case of contamination by heavy metals and other substances that can accumulate in an organism, biological cleansing will result in a later secretion of the heavy metals and other substances by the organism involved. As a result the contaminants are only transferred to an organism rather than being completely removed. Biological methods for fighting pollution demand considerable space and depend on various variables, such as the type of pollution as well as temperature and humidity conditions.

SUMMARY OF THE INVENTION

It has turned out that water-soluble compounds, steam-distillable compounds as well as extractable and/or swellable compounds, which are hydrophobic/water-insoluble, can be removed from contaminated materials by a simple method carried out in a simply equipped container under conditions requiring only a low energy consumption and where none of the fluids used are disposed of in the environment.

This is accomplished by the method according to the invention characterized by
(1) charging the contaminated material into a container having means for introducing and distributing steam and liquid as well as means for removing fluids,
(2) introducing steam and removing fluids including some contaminants,
(3) extracting the material by introducing an extractant and removing the remaining water, extractant and contaminants,
(4) stripping the extracted material with steam, and
(5) removing the decontaminated, dry or slightly humid material from the container.

The method according to the invention comprises the following steps. The contaminated material is collected from the polluted area without having to be sorted or physically disintegrated and is directly charged into the container. For collecting the contaminated material, a digger or excavator can be used, excavating the material and transporting it to a truck or directly to the container when using a mobile assembly.

It is not necessary to sort the material, since the presence of for instance sea weed, stone, brickbats or rubble does not interfere with the inventive method.

In the container the material is first treated with steam thus heating the material to for instance between approx. 10° C. below and approx. 20° C. above the boiling point of the extractant used. It is preferred to heat the material to approx. 10° C. above said boiling point. Simultaneously the material is deteriorated. It is important for the subsequent extraction that the air is expelled. If this is not done undesired reactions between air and the extractant may occur. In case a halogenated hydrocarbon, such as methylene chloride, is used as extractant, the presence of air in the assembly could result in the formation of hydrohalogenic acid, such as hydrochloric acid, free halogen, such as chlorine, and phosgene and corresponding halo compounds. The formation of hydrohalogenic acid, such as hydrochloric acid, involves a risk of corrosion, which means that a suitable choice of expensive construction material for an assembly would be necessary. Moreover, the various reactions result in extractant being lost. Finally, some of the reaction products are exceedingly toxic and therefore present a considerable risk. The steam treatment opens the material, i.e. renders the material more porous and receptive. The opening is a pretreatment for improving the subsequent extraction, for example for ensuring an improved distribution of extractant. During adiabatic heat exchange with the material the liquid extractant first passes to a gaseous state and then condensates again. The latter results in a deep penetration throughout the material and even into the smallest pores and pockets. Instead of being suspended and thereby entrained during aqueous extraction due to hydrogen bond with water, fine material, such as clay, is precipitated by the steam treatment, whereby it is ensured that also this fine material is subjected to the same treatment as the other materials. During the first steam treatment some of the water-insoluble, organic compounds are also removed, as they are entrained during steam distillation.

Subsequent to the first steam treatment the extractant is introduced. In the beginning when the material in the container is still hot, flash-vaporization takes place. An azeotropic mixture of water and extractant is distilled and also entrains contaminants, such as polymeric materials usually insoluble in water as well as in the extractant.

During continued introduction of extractant the temperature drops, and the extractable compounds are extracted. The extraction continues until the material in the container is of the desired purity. The extractant is easily separated from water and can be purified for re-use by distillation. In one embodiment of the invention the extractant is continuously purified during the entire extraction process. In an alternative embodiment the same portion of extractant is circulated through the container until substantially no further amounts of contaminants can be taken up. If the material in the container has not obtained the desired purity after such a treatment, the process is repeated with a new portion of extractant. When the extractant is recirculated water can advantageously be separated.

In practice several containers can be used, where the extractant is directly transferred from one container to the next or a portion of the extractant is first circulated through the first container and is subsequently transferred to the next container. In this manner the extractant is efficiently utilized, for instance by stepwise countercurrent extraction.

Since the material remains in the same container during the entire purification process, it is comparatively inexpensive to perform the extraction the necessary number of times and/or for a sufficiently long period of time to ensure the complete removal of contaminants. The removal of for instance the last 10% of contaminants is less expensive by the present method compared to known methods.

When using a suitable extractant such as methylene chloride, high molecular polymeric compounds are also removed by swelling and/or dissolving them.

Subsequent to extraction the material is again treated with steam thus stripping the material. During stripping the material is again subjected to an azeotropic distillation, where the extractant and further contaminants, such as materials swelled during the extraction, are removed with the leaving fluids, e.g. in form of an aerosol.

After the latter step the material is in a dry or slightly humid state and completely free of extractant. Now the material has been purified to such an extent that it can be directly returned to the site of origin.

The contaminant-containing extractant resulting from the inventive method is advantageously purified by means of distillation and is re-used, ensuring a low consumption of extractant and avoiding problems with the disposal of used extractant.

During the inventive method the extraction is advantageously performed in one or several steps, where in each step one portion of the extractant circulates in a cycle, wherein water is preferably continuously separated from the extractant, and where subsequent to each step the extractant is transferred to a second container with contaminated material or is purified for re-use. This allows the extraction being performed as a stepwise coutercurrent extraction thus ensuring an efficient utilization of the extractant.

In a further embodiment the extraction is advantageously performed by the extractant being continuously purified and re-used. This ensures that the method can be carried out on a simple assembly, i.e. an inexpensive and easily opertaable assembly.

The extractant used is preferably selected among low boiling and/or volatile, water-insoluble solvents or mixtures of solvents of a specific gravity considerably different from, preferably higher than the one for water. As a result the extractant is easily separatable from water. The extractant has a low boiling point and/or is volatile so that it can be easily separated from the dissolved contaminants, for instance by distillation.

Especially preferred extractants comprise carbodisulphide and halogenated hydrocarbons, such as methylene chloride. These solvents possess the above characteristics. Carbodisulphide is especially suitable for extracting sulphurous contaminants. Methylene chloride, $CH_2Cl_2$, is an especially suitable extractant, since it is easily separated from water as well as organic compounds due to its low boiling point of approx. 42° C., and its high specific gravity of 1.3 $g/cm^3$. It is furthermore inexpensive in use due to its low vapourisation heat and can act as a swelling agent for polymeric compounds, which facilitates their removal. Methylene chloride promotes precipitation of small clay particles so that they are not entrained during extraction. Methylene chloride is also easily removed by stripping with steam so that no contaminating residue remains in the soil.

After the first steam treatment of the contaminated material in the container the material has a temperature of from 10° C. below to 20° C. above the boiling point of the extractant used, preferably about 10° C. above. As a result the material is suitably opened and prepared for the subsequent extraction, as mentioned above.

The introduction rate for the steam and the extractant in the container is advantageously adjustable taking the physical texture of the contaminated material and the amount of contamination into account.

The extractant, preferably methylene chloride, is separated from water by means of for instance gravimetric separation. In this case the mixture of methylene chloride and water is transferred to a container or unit (separator), where the light-weight fraction, i.e. water, is removed at the top and the heavy-weight fraction, i.e. methylene chloride, is removed at the bottom. The separation rate can be increased by allowing the mixture to pass through a loosely packed material comprising for instance fine glass fibers, the surface of which coalesces emulsified small drops to large drops, thus increasing the phase separation rate.

For purifying the extractant comprising the contaminants it is transferred to a distilling unit, where it is subjected to simple distillation combined with direct steam injection. The combination results in an azeotropic distillation, where the extractant is separated from the residue of contaminants. The extractant is then cooled and separated from water in a second separating unit and finally transferred to a reservoir to be re-used.

The contaminated water collected in the separating unit situated before the distilling unit is transferred to the distilling unit during the final stripping of the material in the container. The water collected in the second separating unit is also transferred to the distilling unit. The combined water fractions transferred to the distilling unit form a dispersion with the residue in the distilling unit. Without this transfer of further water the residual contaminants are usually present in solid or highly viscous form. The addition of water ensures that the collected contaminants are present in liquid form suitable for subsequent incineration. In this way the combustion energy of the material can be utilized.

Consequently the formation of contaminant-containing waste water is avoided, the disposal of which otherwise causes problems.

In an advantageous embodiment of the distilling unit it is possible to recover a number of contaminants. It is thus possible to obtain chlorinated hydrocarbons and oils in a pure, usable state.

The method according to the invention is suitable for purifying contaminated material, such as soil, sand, gravel, stone, clay and the like, found in for instance old waste deposits, oil-contaminated coastal areas and other contaminated areas, as well as drilling mud from oil drilling onshore as well as offshore.

Examples of contaminants to be removed by the method according to the invention include especially oil-based and bitumen-based products, such as hydrocarbons including polyaromatic hydrocarbons, tars and phenols. Further examples of compounds which can be removed include chlorinated hydrocarbons and esters. Polymeric compounds can also be removed by the polymeric compounds being swelled or dissolved during the treatment.

The inventive method employs only small amounts of water added in form of steam. The amount of water is combined with the concentrated residue of contaminants, the latter usually occuring in solid form and thus being difficult to handle. By adding this water the residue is converted to a dispersion containing usually 50% by weight of water.

Depending on the composition of the contaminants the aqueous, fluid contaminant concentrate can be either incinerated, where it is directly injected in an incinerator, or it can be processed for re-use.

The method according to the invention can be performed on an assembly characterized by comprising a cycle having, in the following sequence, a container with means for introducing and distributing steam and liquid as well as a means for removing fluids, a first unit for separating water and extractant, a distilling unit, a cooling device and a second unit for separating water and extractant as well as a reservoir.

The assembly comprises advantageously a further cycle wherein the extractant from the fluids removing means is returned to the liquid introducing and distributing means, said cycle comprising the container and a pump. Such a cycle allows the circulation of the extractant until it cannot take up further contaminants. The first unit for separating water and extractant is advantageously included in said second cycle so that the water is removed from the extractant before the latter is returned to the container.

The units for separating water and extractant are advantageously gravimetric separators. This type of separating unit is suitable for the separation of water and extractant provided they are not miscible and of a considerably different specific gravity.

The gravimetric separators advantageously comprise a material with an extensive surface area, preferably loosely packed fibers, such as glass fibers. By means of adhesion to large surfaces of said material an emulsion of the phases to be separated is broken down, i.e. small drops are coalesced to large drops, which are easier to separate gravimetrically.

In a very simple inventive assembly the first separating unit may be omitted.

The method according to the invention is advantageously carried out in a mobile assembly, thus avoiding unnecessary, expensive and dangerous transport of the contaminated material. The soil is replaced to its place of origin and only the contaminants have been removed after a successful purification. Consequently unnecessary work connected with filling up and re-establishing the area with supplement material is avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The method and the assembly according to the invention are described in greater detail below and with reference to the accompanying drawing, in which.

DESCRIPTION OF THE PREFERRED EMBODIMENTS

Figure 1:
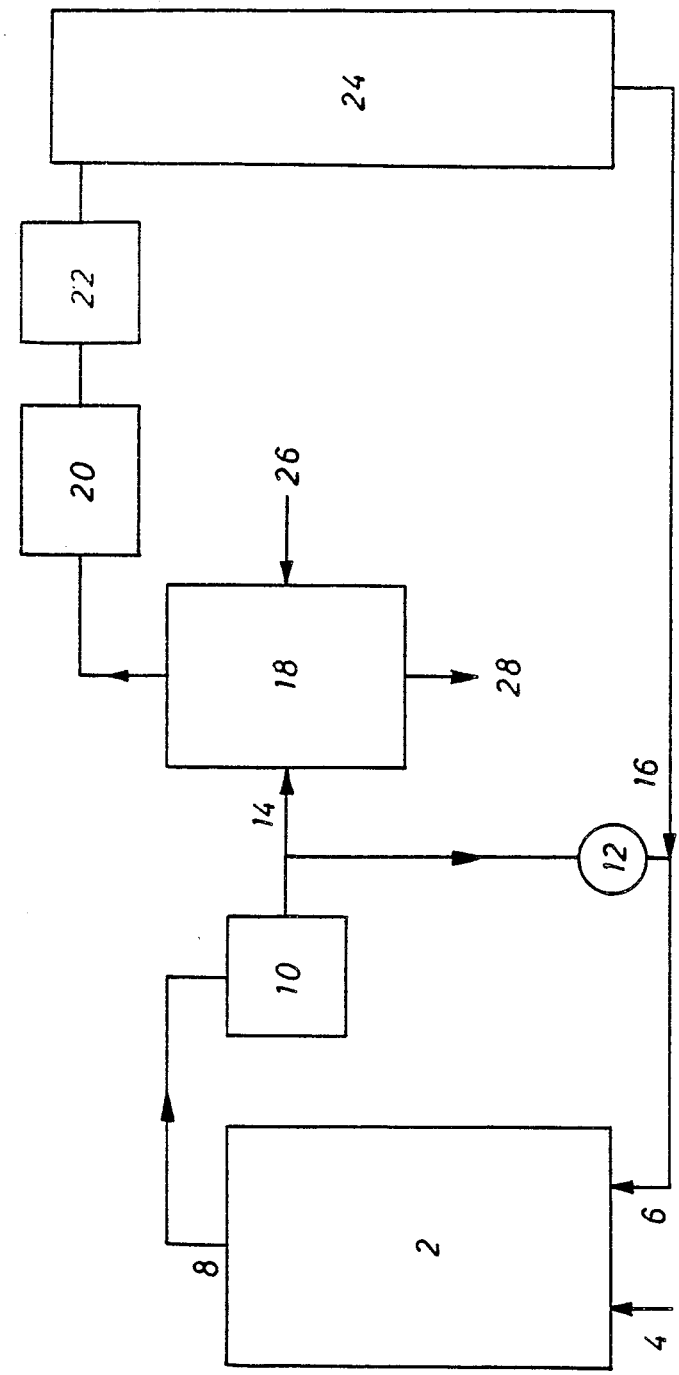
FIG. 1 is a diagrammatic view of the assembly for carrying out the method according to the invention.

As is apparent from FIG. 1, the inventive assembly comprises a container 2 provided with an inlet 4 for introducing steam as well as an inlet 6 for introducing the extractant. The container 2 is arranged in such a way that the introduced steam and extractant are distributed in the contaminated material previously charged into the container 2. Subsequent to charging the material into the container 2, steam is introduced through the inlet 4 thus heating the material to a temperature of approx. 10° C. above the boiling point of the extractant used. Steam, condensate and part of the contaminants are removed through an outlet 8 and transferred to a first separating unit 10, where they are collected.

Thereafter extractant is supplied from a reservoir 24 to the container 2 via a supply means 16 through the inlet 6. At the beginning of the introduction the extractant is flash-evaporated when heated by the material in the container 2. Continuing the introduction the material is gradually cooled so that the extraction process is continued with liquid extractant. A fluid mixture of extractant, water and contaminants is removed at the outlet 8. The extraction is continued by continuously introducing extractant until the material in the container 2 is of the desired purity.

Subsequent to this treatment steam is again introduced through the inlet 4 into the container 2 for stripping the material. Extractant together with further contaminants is removed during the stripping from the material in the container 2 through the outlet 8. After the stripping the material can be removed from the container 2 in a dry or slightly humid state and containing no contaminants. The material is thus in a suitable condition for being returned to its place of origin.

The mixture of extractant, water and contaminants removed through the outlet 8 is transferred to a first separating unit 10, where water is separated from the extractant. The latter is then transferred to a distilling unit 18, where it is subjected to a direct distillation with injection of steam through a supply line 26. The distillate from the distilling unit 18 is removed in form of an azeotropic mixture. The mixture is cooled in a cooler 20 and transferred to a second separating unit 22, where the extractant is separated from water. Then the pure extractant is transferred to the reservoir 24, wherefrom it can be used again through the supply means 16 and the inlet 6.

In an alternative embodiment the extractant is used in portions. A portion of the extractant is circulated by means of a pump 12 until a suitable amount of contaminants has been taken up. When circulating the extractant the first separating unit 10 is advantageously included in the cycle. When one portion of the extractant has been circulated, it can be purified in the manner described above and transferred to the reservoir 24, whereupon a new portion of extractant can, if necessary, be introduced. This process can be repeated several times.

During the stripping the water collected in the separating unit 10 is transferred to the distilling unit. The water collected in the second separating unit 22 can also be transferred to the distilling unit. After a finished distillation the residue in the distilling unit 18 is a dispersion of contaminants in water. The dispersion can be collected via an outlet line 28 and is easy to handle. The dispersion has a comparatively low content of water and is thus suitable for incineration in an incinerator utilizing the combustion energy of the contaminants.

For the sake of clarity FIG. 1 illustrates only one container 2. In practice several such containers can be connected either parallel or in series.

The assembly according to the invention can for instance be provided in form of transportable modules having the size of a standard transport container.

Two such modules can, for instance, represent service modules comprising the distilling unit, the water separators, the reservoir and the steam generator. These two service modules can serve several containers each having the size of a standard transport container.

The inventions is described in greater detail below by means of several examples. The assembly used for carrying out the examples is on a laboratory scale, corresponding to FIG. 1. The capacity of the container 2 is approx. 12 kg. For the one-step extraction a portion of 1 1.1 of extractant was used. This portion was circulated by means of the pump 12. During multi-step extraction the first extraction was performed with 1 1.1 of extractant, as above, while the subsequent steps were carried out by introducing approx. 7.1 of extractant from the reservoir 24. A corresponding amount of the used extractant was transferred to the distilling unit 18 by displacement, where it was purified by distillation and transferred to the reservoir in the manner described above. For the steam stripping prior and subsequent to the extraction the steam was of a temperature of approx. 115–120° C.

EXAMPLE 1

Soil contaminated with old asphalt material was decontaminated in a laboratory-scale assembly. The content of bituminous material in the soil was 11.9 g/kg dry soil. The soil was steam-stripped, extracted in one step with methylene chloride and finally steam-stripped. After the treatment the content of bituminous material was 2.3 g/kg, corresponding to a removal of 80.7% of contaminants.

EXAMPLE 2

A soil sample contaminated with asphal material was decontaminated in a laboratory-scale assembly. The content of bituminous binder was 12.3 g/kg dry soil. The soil was steam-stripped, whereupon it was extracted in four steps with methylene chloride and finally steam-stripped for 7 min until the temperature of the soil was 45°–50° C. After this treatment, which required only a small energy supply, the content of bituminous material was less than 0.1 g/kg, corresponding to a removal of more than 99.2% of contaminants after the fourth extraction step. The final steam-stripping lasting for approx. 7 min resulted in a residue of extractant of 2 ppm. This shows that in practice the extractant can be completely removed after steam-stripping for approx. 15 min. Thus the complete removal of extractant is achieved with an advantageously low energy consumption. The humidity of the soil subsequent to the final steam-stripping was about 15–17%. As a result the soil was decontaminated and of a suitable humidity to be returned to its place of origin.

EXAMPLE 3

Soil from a gas works site contaminated with coal tar pitch and fluid coal tar products was decontaminated in a laboratory-scale assembly. The content of tar materials was 56–68 g/kg dry soil, representing a very extensive contamination. The soil was steam-stripped, whereupon it was extracted in five steps with methylene chloride and finally steam-stripped until the temperature of the soil was approx. 55° C. and its humidity approx. 17%. The content of contaminants in the decontaminated soil was 0.1 g/kg, corresponding to a removal of 99.8% of contaminants after the fifth extraction step. The contaminants in this case, i.e. coal tar materials are usually very difficult to remove. In the present case only the least problematic, very low-volatile and insoluble contaminants remained. All the high-volatile, dangerous compounds were removed. This shows that even in case of a critical contamination, for instance with old tar materials in soil, said soil can be satisfactorily decontaminated. The soil having a humidity of about 17% can be returned to its place of origin.

EXAMPLE 4

Soil contaminated with diesel oil was decontaminated in a laboratory-scale assembly. The soil was steam-stripped, whereupon it was extracted in three steps with methylene chloride and finally steam-stripped until the temperature of the soil was approx. 50° C. and its humidity approx. 16%. The content of diesel oil in the contaminated soil was 11.6%, while the decontaminated soil contained 0.1 g/kg, corresponding to a removal of 99.2% of contaminants after the third extraction step. The soil can be returned to its place of origin after a decontamination with 4-5 steps regardless of the future use of the area in question.

The method described in Examples 1-4 provides an inexpensive and efficient decontamination. It is easily performed on or near the contaminated site, thus reducing costs for transport to a minimum or eliminating them completely.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for decontaminating a material comprising
   (1) charging the contaminated material into a container having means for introducing and distributing steam and liquid as well as means for removing fluids,
   (2) introducing steam and removing fluids including some contaminants,
   (3) extracting the material by introducing an extractant and removing the remaining water, extractant and contaminants,
   (4) stripping the extracted material with steam, and
   (5) removing the decontaminated, dry or slightly humid material from the container.

2. A method as in claim 1, wherein the extraction is performed in one or several steps, where in each step one portion of the extractant circulates in a cycle, and where subsequent to each step the extractant is purified for re-use.

3. A method as in claim 1, wherein the extraction is performed in one or several steps, where in each step one portion of the extractant circulates in a cycle, wherein water is continuously separated from the extractant, and where subsequent to each step the extractant is purified for re-use.

4. A method as in claim 1, wherein the extraction is performed in one or several steps, where in each step one portion of the extractant circulates in a cycle, and where subsequent to each step the extractant is transferred to a second container with contaminated material.

5. A method as in claim 1, wherein the extraction is performed in one or several steps, where in each step on a portion of the extractant circulates in a cycle, wherein water is continuously separated from the extractant, and where subsequent to each step the extractant is transferred to a second container with contaminated material.

6. A method as in claim 1, wherein the extraction is performed with continuous purification and re-use of the extractant.

7. A method as in claim 1, wherein the extractant is selected among low-boiling and/or volatile, water-insoluble solvents or mixtures of solvents of a specific gravity considerably different from the one for water.

8. A method as in claim 7, wherein the extractant has a specific gravity considerably higher than the one for water.

9. A method as in claim 7, wherein the extrantant is selected among carbodisulphide or a halogenated hydrocarbon.

10. A method as in claim 9, wherein the extractant is methylene chloride.

11. A method as in claim 1, wherein subsequent to the steam treatment the material has a temperature of from 10° C. below to 20° C. above the boiling poin6t of the extractant used.

12. A method as in claim 11, wherein subsequent to the steam treatment the material has a temperature of about 10° C. above the boiling point of the extractant used.

* * * * *